(12) United States Patent
Hinrichs et al.

(10) Patent No.: US 10,358,512 B2
(45) Date of Patent: Jul. 23, 2019

(54) ETHYLENE-BASED POLYMERS WITH LOW HEXANE EXTRACTABLES

(71) Applicant: Dow Global Technologies LLC, Midland, MI (US)

(72) Inventors: Stefan Hinrichs, Wondelgem (BE); Cornelis F. J. Den Doelder, Terneuzen (NL); Nhi T. Y. Dang, Terneuzen (NL); Otto J. Berbee, Hulst (NL)

(73) Assignee: Dow Global Technologies LLC, MIdland, MI (US)

( * ) Notice: Subject to any disclaimer, the term of this patent is extended or adjusted under 35 U.S.C. 154(b) by 16 days.

(21) Appl. No.: 15/574,291

(22) PCT Filed: Jun. 23, 2016

(86) PCT No.: PCT/US2016/038900
§ 371 (c)(1),
(2) Date: Nov. 15, 2017

(87) PCT Pub. No.: WO2016/210055
PCT Pub. Date: Dec. 29, 2016

(65) Prior Publication Data
US 2018/0127523 A1  May 10, 2018

Related U.S. Application Data

(60) Provisional application No. 62/184,344, filed on Jun. 25, 2015.

(51) Int. Cl.
*C08F 110/02* (2006.01)
*C08F 2/01* (2006.01)
(Continued)

(52) U.S. Cl.
CPC ......... *C08F 110/02* (2013.01); *B01J 19/2415* (2013.01); *C08F 2/001* (2013.01);
(Continued)

(58) Field of Classification Search
CPC .. C08F 110/02; C08F 2/38; C08F 2/01; C08F 4/38; C08F 2500/08; C08F 2500/12;
(Continued)

(56) References Cited

U.S. PATENT DOCUMENTS

| 7,820,776 | B2 | 10/2010 | Neuteboom et al. |
| 2008/0242809 | A1 | 10/2008 | Neuteboom et al. |
| 2015/0111053 | A1* | 4/2015 | Nummila-Pakarinen ..... C08F 110/02 428/523 |

FOREIGN PATENT DOCUMENTS

| WO | 0168723 A2 | 9/2001 |
| WO | 0214379 A1 | 2/2002 |

(Continued)

OTHER PUBLICATIONS

International Search Report and Written Opinion pertaining to PCT/US2016/038900 dated Oct. 12, 2016.

(Continued)

*Primary Examiner* — William K Cheung
(74) *Attorney, Agent, or Firm* — Dinsmore & Shohl LLP

(57) ABSTRACT

The invention provides an ethylene homopolymer formed from a free-radical, high pressure polymerization process in a tubular reactor system, said homopolymer comprising the following properties: (A) a density from 0.9190 to 0.9250 g/cc; (B) a hexane extractable level that is less than, or equal to, 2.6 wt %, based on the total weight of the polymer; (C) a G (at G"=500 Pa, 170C) that meets the following equation: G>D+E[log(12)], where D=150 Pa and E=−60 Pa/[log(dg/min)]; and (D) a melt index (12) from 1.0 to 20 dg/min.

10 Claims, 3 Drawing Sheets

Flow Scheme for Inventive Example 1 to 5

(51) Int. Cl.
*C08F 2/38* (2006.01)
*C08F 4/38* (2006.01)
*B01J 19/24* (2006.01)
*C08F 2/00* (2006.01)

(52) U.S. Cl.
CPC .......... *C08F 2/01* (2013.01); *C08F 2/38* (2013.01); *C08F 4/38* (2013.01); *C08F 2400/02* (2013.01); *C08F 2500/08* (2013.01); *C08F 2500/12* (2013.01); *Y02P 20/582* (2015.11)

(58) Field of Classification Search
CPC .......... C08F 2500/17; C08F 2500/02; B01J 19/2415; Y02P 20/582
USPC .......................................................... 526/64
See application file for complete search history.

(56) References Cited

FOREIGN PATENT DOCUMENTS

| | | |
|---|---|---|
| WO | 2006094723 A1 | 9/2006 |
| WO | 2007110127 A1 | 10/2007 |
| WO | 2012084787 A1 | 6/2012 |
| WO | 2012117039 A1 | 9/2012 |
| WO | 2013059042 A1 | 4/2013 |
| WO | 2013078018 A2 | 5/2013 |
| WO | 2013078224 A1 | 5/2013 |
| WO | 2013083285 A1 | 6/2013 |
| WO | 2013132011 A1 | 9/2013 |
| WO | 2013149698 A1 | 10/2013 |
| WO | 2013178241 A1 | 12/2013 |
| WO | 2013178242 A1 | 12/2013 |
| WO | 2014003837 A1 | 1/2014 |
| WO | 2014081458 A1 | 5/2014 |
| WO | 2014190036 A1 | 11/2014 |
| WO | 2014190041 A1 | 11/2014 |
| WO | 2015166297 A1 | 11/2015 |

OTHER PUBLICATIONS

Goto et al., "Computer Model for Commercial Highpressure Polyethylene Reactor Based on Elementary Reaction Rates Obtained Experimentally", Journal of Applied Polymer Science: Applied Polymer Symposium, 1981, 36, 21-40.

Yamamoto et al., "Rate Constant for Long-Chain Branch Formation in Free-Radical Polymerization of Ethylene", Journal of Macromolecules, 1979, 1057.

* cited by examiner

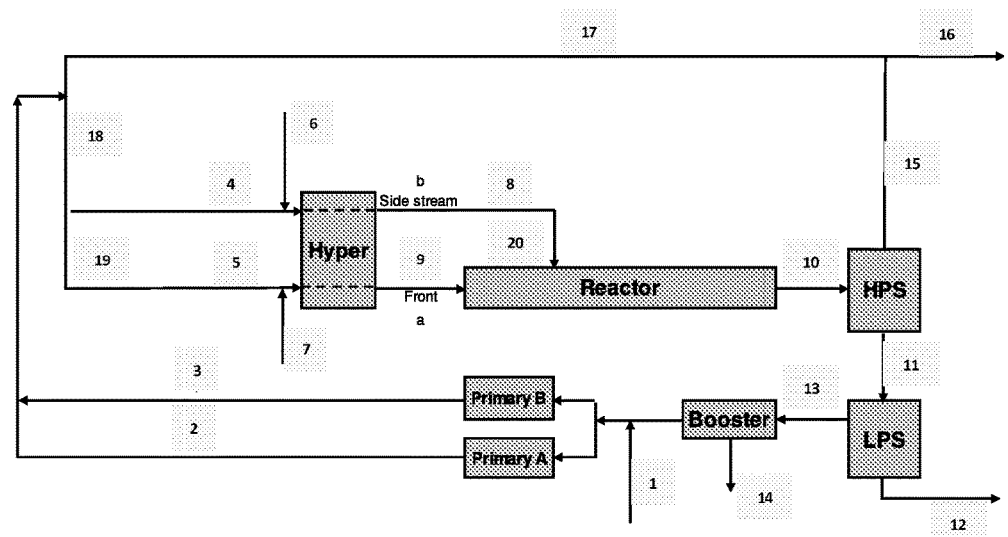
FIGURE 1: Flow Scheme for Inventive Example 1 to 5
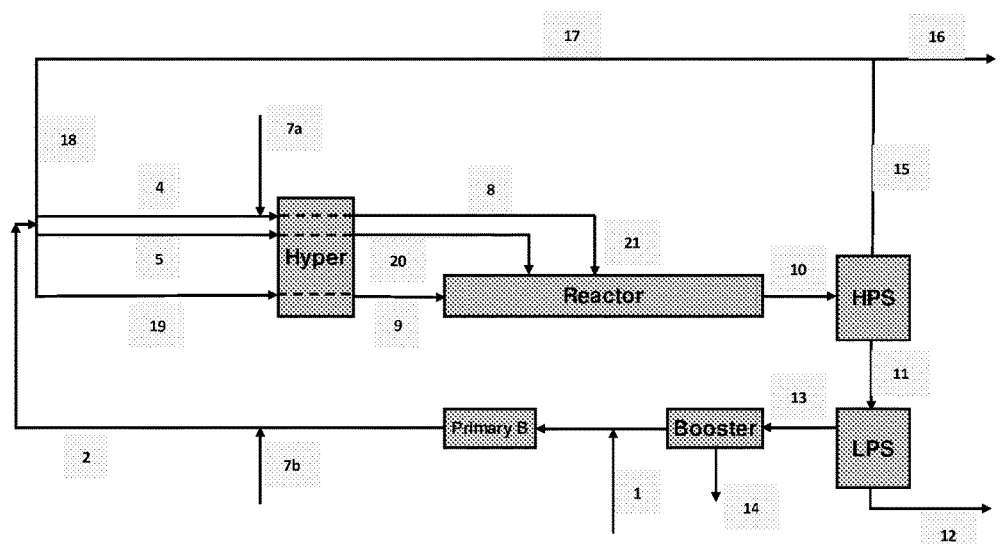
FIGURE 2: Flow Scheme for Inventive Examples 6 to 13 and Comparative Example CE 13

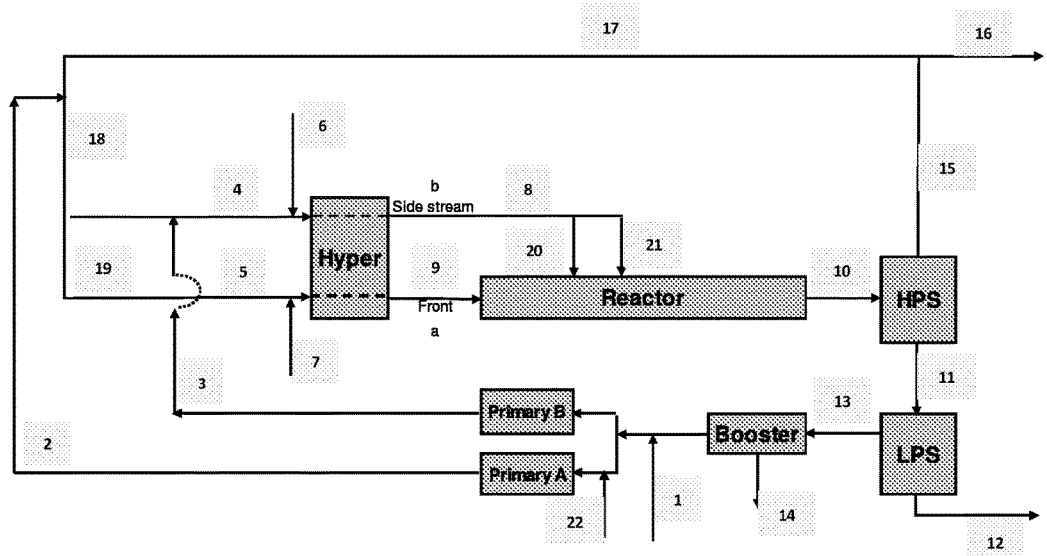
FIGURE 3: Flow Scheme for Comparative Examples 6', 10' and 11'
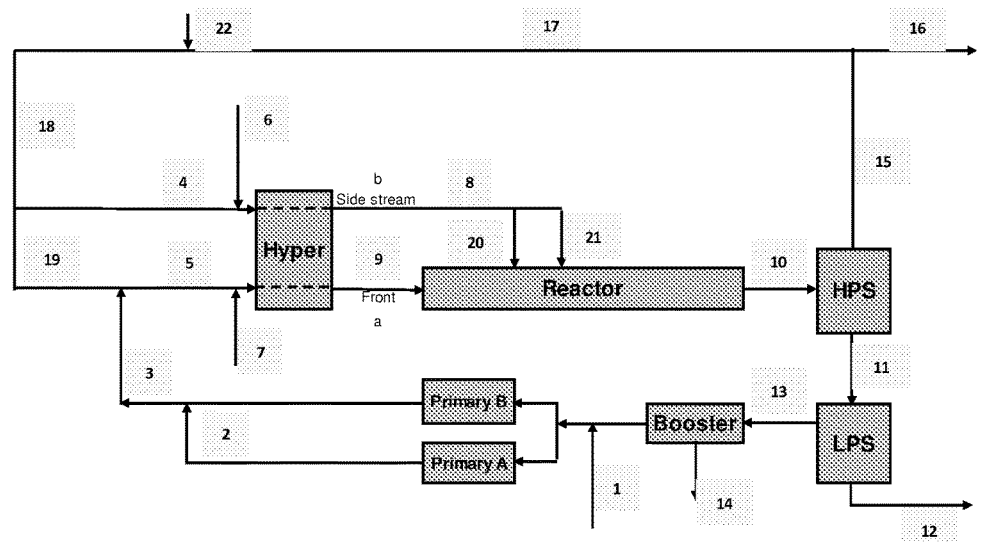
FIGURE 4: Flow Scheme for Comp. Examples 7' and 12'

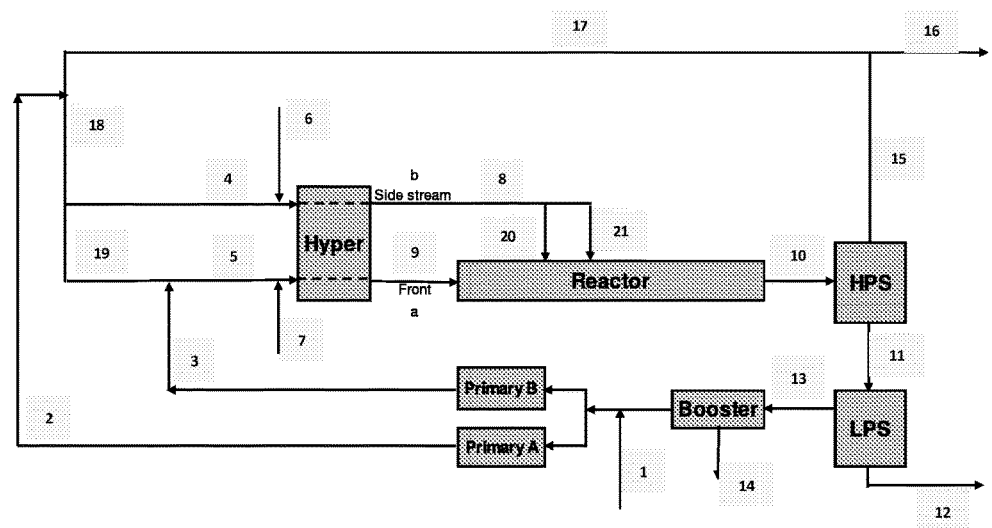
FIGURE 5: Flow Scheme for Comparative Examples 3' to 5', 8' and 9'

ETHYLENE-BASED POLYMERS WITH LOW HEXANE EXTRACTABLES

REFERENCE TO RELATED APPLICATIONS

This is the U.S. National Stage of International Application No. PCT/US2016/038900, filed Jun. 23, 2016, which claims the benefit of U.S. Provisional Application No. 62/184,344, filed Jun. 25, 2015, the contents of which are incorporated by reference herein in their entirety.

BACKGROUND

Resins for extrusion coating on paper, board, aluminum, etc., are designed with broad molecular weight distribution and low extractables. In extrusion coating applications, the polymer is processed at high temperature conditions, typically above 280° C. and below 350° C. Broad molecular weight distribution (MWD) resins with a very high molecular weight fraction are used for good processability during coating (neck-in and drawdown balance). Low extractables are needed to reduce undesirable taste and odor, and to reduce smoke formation during the processing of the resin, especially during the high coating temperatures. Typically LDPE (low density polyethylene) resins with broad MWD are made using autoclave reactors or a combination of autoclave and tube reactors. Broad MWD resins can be made by promoting long chain branching, and through the inherent residence time distribution, by which molecules will undergo shorter (low molecular weight) or longer (high molecular weight) growth paths. Broad MWD autoclave resins for LDPE extrusion coatings are focused in two product density regimes, namely from 0.915 to 0.919 g/cc and from 0.919 to 0.924 g/cc. This invention describes improved broad MWD tubular reactor products designed for the higher density regime from 0.919 to 0.924 g/cc. The autoclave and tubular reactor systems differ in residence time distribution, which is more uniform for tubular reactors and dispersed for autoclave reactor zones.

The uniform residence time leads to narrower MWD, and very broad MWD can only be achieved in tubular reactors by applying extremely differentiated polymerization conditions, for example, as described in WO 2013/078018, and/or application of a branching/cross-linking agent, for example, as described in U.S. Pat. No. 7,820,776. The use of extreme process conditions and/or costly branching/cross-linking agents can lead to high melt strength tubular low density polyethylene, suitable for extrusion coating applications; however with elevated extractables. Undesirable gels in the polymer can result from the use of branching or cross-linking agents. Due to the difference in cooling capability, the conversion level ranges, typically, from less than 20% (autoclave) to more than 30% (tubular). This large difference in conversion level has a major impact on investment and operation costs, as well on polymer output and power consumption (to compress ethylene) per unit of polymer. U.S. Publication No. 2008/0242809 discloses a process for preparing an ethylene copolymer, where the polymerization takes place in a tubular reactor, at a peak temperature between 290° C. and 350° C. The comonomer is a di- or higher functional (meth)acrylate. Other polymers and processes are disclosed in EP 2 681 250 A1, WO 2007/110127; WO 2014/003837; WO2013/078018; WO2013/078224; WO2013/178241; WO2013/178242; WO2013/149698; WO2013/132011 and WO2013/083285. There is a need for ethylene homopolymers made at density ≥0.919 g/cc, with broad MWD, high G' value and at reduced extractable levels, in a tubular reactor, at high ethylene conversion levels. Further, such ethylene homopolymers should be cost effective to make, not requiring additional costs associated with modifying or branching agents. These needs have been met by the following invention.

SUMMARY OF THE INVENTION

The invention provides an ethylene homopolymer formed from a free-radical, high pressure polymerization process in a tubular reactor system, said homopolymer comprising the following properties:
(A) a density from 0.9190 to 0.9250 g/cc;
(B) a hexane extractable level that is less than, or equal to, 2.6 wt %, based on the total weight of the polymer;
(C) a G' (at G"=500 Pa, 170° C.) that meets the following equation: G'≥D+E[log(I2)], where D=150 Pa and E=−60 Pa/[log(dg/min)]; and
(D) a melt index (I2) from 1.0 to 20 dg/min.

BRIEF DESCRIPTION OF THE DRAWINGS

FIG. 1 is a flow diagram for Inv. Exs. 1 to 5.
FIG. 2 is a flow diagram for Inv. Exs. 6 to 13 and Comp. Ex 13.
FIG. 3 is a flow diagram for Comp. Exs. 6, 10 and 11.
FIG. 4 is a flow diagram for Comp. Exs. 7 and 12.
FIG. 5 is a flow diagram for Comp. Exs. 3 to 5, 8 and 9.

DETAILED DESCRIPTION

Ethylene homopolymers have been discovered that have densities ≥0.9190 g/cc with broad MWD, high G' value and at reduced extractable levels in a tubular reactor at high ethylene conversion levels, and which are cost effective to make, not requiring additional costs associated with modifying or branching agents. These inventive ethylene homopolymers are described above. An inventive homopolymer may comprise a combination of two or more embodiments described herein.

In one embodiment, the ethylene-based homopolymer has a melt index ($I_2$) from 1.0 to 18 dg/min, or from 1.5 to 15 dg/min, or from 2 to 12 dg/min. In one embodiment the ethylene-based polymer has a density ≥0.9190 grams per cubic centimeter (g/cc or g/cm$^3$). In one embodiment the ethylene-based polymer has a density ≤0.9245, or ≤0.9240, or ≤0.9235, or ≤0.9230 g/cc. In one embodiment the ethylene-based polymer has a density from 0.9190 to 0.9240 g/cc, or from 0.9195 to 0.9235, or from 0.9200 to 0.9230, g/cc.

In one embodiment, the ethylene homopolymer has a hexane extractable level that is greater than the lower of one of the following:
(1) (A+(B*density (g/cc))+(C*log(MI) dg/min)), based on total weight of the ethylene-based polymer; where A=250.5 wt %, B=−270 wt %/(g/cc), C=0.25 wt %/[log(dg/min)], or
(2) 2.0 wt %, based on the total weight of the polymer.

In one embodiment, the ethylene homopolymer has a vinyl content less than, or equal to, 0.15 vinyl groups per 1000 total carbons.

The invention also provides a composition comprising an inventive ethylene homo polymer as described herein. In one embodiment, the composition further comprises another ethylene-based polymer that differs from the inventive ethylene-based polymer in one or more properties, for example, density, melt index ($I_2$), weight average molecular weight (Mw(conv)), number average molecular weight (Mn(conv)), and/or Mw(conv)/Mn(conv).

An inventive composition may comprise one or more additives, such as stabilizers (e.g., antioxidants), plasticizers, antistatic agents, pigments, dyes, nucleating agents, fillers, slip agents, fire retardants, processing aids, smoke inhibitors, viscosity control agents and anti-blocking agents. The polymer composition may, for example, comprise less than 10 wt % of the combined weight of one or more additives, based on the weight of the composition.

The invention also provides an article comprising at least one component formed from an inventive composition. In one embodiment, the article is a film or a coating, for example, an extrusion coating. In one embodiment, the article is a film. In another embodiment, the article is a coating. In one embodiment, the article is a coating for a cable or wire. In one embodiment, the article is a coated sheet, and in a further embodiment the sheet is selected from a metal, a paper, or another polymer substrate or combinations thereof. In a further embodiment, the coated sheet is used in a wire or cable configuration. In another embodiment, the coated sheet is used in a packaging application. In another embodiment, the coated sheet is used in a food packaging application, and further the coated sheet is used in a cook-in food packaging application. An inventive ethylene-based polymer may comprise a combination of two or more embodiments as described herein. An inventive composition may comprise a combination of two or more embodiments as described herein. An inventive article may comprise a combination of two or more embodiments as described herein.

The invention also provides a process for producing the ethylene homopolymer of any one of the previous claims, the process comprising polymerizing a reaction mixture comprising ethylene and at least one free radical, in a reaction configuration, comprising a first tubular reaction zone 1 and a last tubular reaction zone i, in which i is greater than, or equal to, ($\geq$) 3, and under high pressure polymerization conditions ($\geq$1000 bar (100 MPa)), and wherein the "inlet pressure of the polymerization" is greater than, or equal to, [1800 Bar+(100 Bar x # of reaction zones)]. In a further embodiment, x$\geq$3, or $\geq$4, or $\geq$5, or $\geq$6.

In one embodiment, the first tubular reaction zone 1 has a peak temperature of $\geq$320° C., or $\geq$330° C., and the last tubular reaction zone i has a peak temperature of $\leq$290° C., or $\geq$300° C., or $\geq$310° C.

In one embodiment, the reactor configuration comprises at least four reaction zones (i is $\geq$4), and further, these zones can be located in one tubular reactor or spread over two or more tubular reactors. Typically, each tubular reactor comprises multiple reaction zones.

In one embodiment, the polymerization takes place in at least one tubular reactor. In one embodiment, the polymerization takes place in one reactor with multiple or at least two reaction zones. In one embodiment, the polymerization takes place in a reactor configuration comprising at least four reaction zones, reaction zone 1 and reaction zone i (i$\geq$3) and wherein reaction zone i is downstream from reaction zone 1. In one embodiment, i is from 3-5, or from 3-4. In one embodiment, i=3. In one embodiment, the total number of reaction zones=i. In a further embodiment, i is from 3 to 20, further from 3 to 10, and further from 3 to 6. In a further embodiment, i is from 3 to 20, further from 3 to 10, and further from 3 to 6.

Typically, a tubular reactor is a jacketed tube having one or more reaction zones is used as a reactor. Suitable, but not limiting, reactor lengths may be from 100 to 3600 meters (m), or from 1000 to 2800 m.

Often a CTA system is used to control molecular weight. A CTA system comprises one or more CTAs. CTAs typically comprise at least one of the following groups: alkanes, aldehydes, ketones, alcohol, ether, esters, mercaptan or phosphine, and further an alkane, a ketone, an aldehyde, an alcohol or ether. CTAs include, but are not limited to, isobutane, n-butane, methyl ethyl ketone, acetone, ethyl acetate, propionaldehyde, ISOPAR-C, -E, and -H (Exxon-Mobil Chemical Co.), and isopropanol; and further propionaldehyde, butane and isobutane. The CTA is preferably not propylene or another alkene. In one embodiment, the amount of CTA used is from 0.01 to 10 weight percent based on the weight of the total reaction mixture. In one embodiment, the overall Cs value of the applied CTA systems is $\leq$0.020 (e.g., propylene, acetone,), or $\leq$0.010 (i.e., cyclohexane), or $\leq$0.008 (e.g., isobutane, ethanol), or $\leq$0.006 (e.g., n-butane, ethylacetate), as measured by Mortimer et al., at 130° C. and 1360 atmospheres.

In one embodiment, a first CTA system having a transfer activity of Z1 is fed into tubular reaction zone 1 and a second CTA system having a transfer activity of Zi is fed into tubular reaction zone i, and the Z1/Zi ratio is $\geq$0.7, or $\geq$0.8.

In one embodiment, a first CTA system having a transfer activity of Z1, is fed into tubular reaction zone 1 and a second CTA system having a transfer activity of Zi, is fed into tubular reaction zone i, and the Z1/Zi ratio is $\leq$1.3, or $\leq$1.2.

In one embodiment, a first CTA system having a transfer activity of Z1, is fed into tubular reaction zone 1 and a second CTA system having a transfer activity of Zi is fed into tubular reaction zone i, and the Z1/Zi ratio is less than, or equal to, (0.8−0.2*log(Cs)), wherein Cs is in the range of 0.0001 and 10, or from 0.0010 to 8.0, or from 0.0050 to 6.0, or from 0.010 to 1.00, or from 0.010 to 0.500.

In one embodiment the Z1/Zi ratio (wherein i$\geq$3 and i is the last reaction zone) is $\leq$1.3, or $\leq$1.2, or $\leq$1.1. In one embodiment the Z1/Zi ratio, wherein i$\geq$3 and i is the last reaction zone, is $\geq$0.1, or $\geq$0.2, or less than or equal to 0.3. In one embodiment Z1/Zi is $\leq$(0.8−0.2*log(Cs)), wherein Cs is in the range of 0.0001 and 10. In one embodiment Z1/Zi is $\leq$(0.75−0.2*log(Cs)), wherein Cs is in the range of 0.0001 and 10. In one embodiment Z1/Zi is $\leq$(0.7−0.2*log(Cs)), wherein Cs is in the range of 0.0001 and 10. In one embodiment, the process includes a high pressure and low pressure recycle loop to improve ethylene efficiency, since ethylene is only partially converted or consumed per reactor pass. Typically, the conversion level per reactor pass is from 20% to 40%. In one embodiment, the polymerization may take place in a tubular reactor as described WO2013/059042, which discloses a multi-zone reactor and alternate locations of feeding ethylene to control the ethylene to CTA ratio and therefore polymer properties. Ethylene may be simultaneously added in multiple locations to achieve the desired ethylene to CTA ratio. In a similar way, addition of CTA addition points may be carefully selected to control polymer properties as described WO2013/078018. CTA may be simultaneously added in multiple locations to achieve the desired CTA to ethylene ratio. In one embodiment, chain transfer agent is added to the first or second or first and second reaction zones.

In one embodiment, the ethylene fed to the first reaction zone is at least 10 wt % of the total ethylene fed to the polymerization. In one embodiment, the ethylene fed to the first reaction zone is from 10 to 100, or from 20 to 80, or from 25 to 75, or from 30 to 70, or from 40 to 60 wt % of the total ethylene fed to the polymerization.

A free radical initiator, as used here, refers to a free radical generated by chemical and/or radiation means. Exemplary free radical initiators include organic peroxides, including cyclic peroxides, diacyl peroxides, dialkyl peroxides, hydroperoxides, peroxycarbonates, peroxydicarbonates, peroxyesters, and peroxyketals. Preferred initiators are t-butyl peroxy pivalate, di-t-butyl peroxide, t-butyl peroxy acetate and t-butyl peroxy-2-hexan-oate, or mixtures thereof. In one embodiment, these organic peroxide initiators are used in an amount from 0.001 to 0.2 wt %, based upon the weight of polymerizable monomers. In one embodiment, an initiator is added to at least one reaction zone, and the initiator has a half-life temperature, at one second, >255° C., or >260° C. In a further embodiment, such initiators are used at a peak polymerization temperature from 320° C. to 350° C. In one embodiment, the initiator comprises at least one peroxide group incorporated in a ring structure, such as TRIGONOX™ 301 (3,6,9-triethyl-3,6,9-trimethyl-1,4,7-triperoxonaan) and TRIGONOX™ 311 (3,3,5,7,7-pentamethyl-1,2,4-trioxepane), both available from Akzo Nobel, and HMCH-4-AL (3,3,6,6,9,9-hexamethyl-1,2,4,5-tetroxonane) from United Initiators. See also WO 02/14379 and WO 01/68723.

In one embodiment, for the polymerization process described herein, the or peak temperature for each reaction zone is from 150° C. to 360° C., or from 170° C. to 350° C., or from 200° C. to 340° C. In one embodiment, the peak temp. in the first reaction zone is >the peak temp. in each subsequent or consecutive reaction zone. In one embodiment, the peak temp. in the first reaction zone is ≥300° C., or ≥310° C., or ≥320° C. In one embodiment, the peak temp. in the first reaction zone is at least 10° C., or 20° C., or 30° C. greater than the peak temp. of each consecutive reaction zone. In one embodiment, the temp. of the first reaction zone is ≥320° C., or ≥330° C., or ≥340° C. In one embodiment, the temp. of the last reaction zone is ≤290° C., or ≤280° C., or ≤270° C. In one embodiment, the polymerization temp. difference between the first and last reaction zone is ≥30° C., or ≥40° C., or ≥50° C. In one embodiment, the difference in polymerization temp. between any two successive reaction zones, e.g., the difference between the first and second reaction zones, or the second and third reaction zones, etc., over the length of the reaction configuration is ≥10° C., or ≥20° C., or ≥30° C. In one embodiment, the polymerization temp. difference between each successive reaction zone, e.g., the difference between the first and second reaction zones, and the second and third reaction zones, etc., over the length of the reaction configuration is ≥10° C., or ≥20° C., or ≥30° C. In one embodiment, the ratio of the polymerization temp. of the first reaction zone (e.g., 320° C.) to the last, or $n^{th}$, reaction zone (e.g., 290° C.) is ≥1.1, or ≥1.2, or ≥1.3. In one embodiment, the peak temp. of the last reaction zone is <the peak temp. of each prior reaction zone.

In one embodiment, the polymerization pressure as measured at the first inlet of the reactor is from 1000 bar to 3600 bar, or from 1200 bar to 3500 bar, or from 1500 to 3400 bar, or from 2000 to 3200 bar.

An inventive process may comprise a combination of two or more embodiments as described herein.

Definitions

Unless stated to the contrary, implicit from the context, or customary in the art, all parts and percents are based on weight, and all test methods are current as of the filing date of this application. The term "composition," as used herein, includes a mixture of materials, which comprise the composition, as well as reaction products and decomposition products formed from the materials of the composition. The terms "blend" or "polymer blend," as used, refers to a mixture of two or more polymers. A blend may or may not be miscible (not phase separated at molecular level). A blend may or may not be phase separated.

The term "polymer" refers to a compound prepared by polymerizing monomers, whether of the same or a different type. The generic term polymer thus embraces the term homopolymer (which refers to polymers prepared from only one type of monomer, with the understanding that trace amounts of impurities can be incorporated into the polymer structure), and the term "interpolymer" as defined below. Trace amounts of impurities may be incorporated into and/or within the polymer. Trace amount of impurities can include initiator residues and other components, like for instance lubrication oil, solvent etc., showing chain transfer activity. The term "interpolymer" refers to polymers prepared by the polymerization of at least two different types of monomers. The generic term interpolymer includes copolymers (which refers to polymers prepared from two different monomers), and polymers prepared from more than two different types of monomers.

The term "ethylene-based polymer" refers to a polymer that comprises a majority amount of polymerized ethylene, based on the weight of the polymer, and, optionally, at least one comonomer. The term "ethylene-based interpolymer" refers to an interpolymer that comprises a majority amount of polymerized ethylene, based on the weight of the interpolymer, and at least one comonomer. The term "ethylene-based copolymer" refers to a copolymer that comprises a majority amount of polymerized ethylene, based on the weight of the interpolymer, and a comonomer as the only monomer types.

The term "free-radical, high pressure polymerization process," as used herein, refers to a polymerization process carried out at an elevated pressure of at least 1000 bar (100 MPa), and in the presence of at least one free-radical.

The term "reactor system," as used herein, refers to the devices used to polymerize and isolate a polymer. Such devices include, but are not limited to, one or more reactors, one or more feed streams, reactor pre-heater(s), monomer-reactor cooling device(s), Secondary compressor(s) (or Hyper compressor(s)), Primary compressor(s), and/or Booster compressor(s). The term "tubular reactor system," as used herein, refers to a reactor system that comprises only one or more tubular reactor(s) as the reactor(s) of the reactor system, and exclude autoclave reactors. When more than one tubular reactor is used, they are preferably used in a series configuration. The term "reactor configuration," as used herein, refers to one or more reactors, and optionally one or more reactor pre-heaters, used to polymerize a polymer. The reactors may be jacketed.

The terms "inlet pressure," or "reactor inlet pressure," or "inlet pressure of the polymerization," or "inlet pressure of the tubular reactor system," or similar terms, as used herein, refers to the pressure level at the inlet of the first reaction zone.

The term "reaction zone," as used herein, refers to a reactor zone where polymerization reaction is initiated or reinitiated by the addition of free radicals or components which dissociate into and/or generate free radicals. Typically, the reaction medium is heated and/or cooled by a heat transfer medium flowing through a jacket around the reactor. A reaction zone typically begins with the addition of make-up and/or recycled ethylene, and/or free radicals or components which dissociate into and/or generate free radicals.

The term "first reaction zone" as used herein, refers to the first reactor zone where the polymerization is initiated by the addition of radicals and/or components which dissociate into and/or generate radicals. The first reaction zone ends at the point where there is a new feed of radicals, and/or components which dissociate into and/or generate radicals, and, optionally, make-up, recycled ethylene, CTA(s), solvent(s) and/or comonomer(s). The terms "subsequent reaction zone," or "sequential reaction zone," as used herein, refer to a reactor zone which receives ethylene and polymer from a previous reactor zone, and where radicals or components which dissociate into and/or generate radicals are added at the inlet of the subsequent (or sequential) reactor zone. The subsequent reaction zone ends at the point where there is a new feed of make-up and/or recycled ethylene, radicals, and/or components which dissociate into and/or generate, radicals; however, the nth reaction zone ends at the position of a pressure control device of the reactor system. The number of subsequent (or sequential) reaction zones is (n−1), where n is the total number of reaction zones.

The term "peak temperature," or the phrase "peak temperature in a reaction zone," or similar phrases, as used herein, refers to the highest temperature measured in a reaction zone. In an autoclave reaction zone (typically, noted as a maximum zone temperature), and in a tubular reaction zone (typically noted as a peak temperature).

The Booster compressor (Booster) is a device that compresses the following: a) the low pressure recycle coming from the LPS (Low Pressure Separator), and b) optionally, the recycled compressor packing leaks, each to the pressure level required at the inlet side of the Primary compressor. A Booster can consist of single or multiple compressor frames, and can be potentially combined with Primary compressor frame(s). The Primary compressor (Primary) is a device that compresses the following: a) the incoming ethylene, and/or b) the low pressure recycle coming from the Booster, and/or c) the recycled compressor packing leaks, each to the pressure level required to feed the inlet side of the Hyper compressor. The Primary can consist of single or multiple compressor frames, and can be potentially combined with Booster compressor frame(s). Hyper compressor (Hyper), or Secondary compressor, is a device that compresses the following: a) ethylene-based components coming from the HPR (High Pressure Recycle), and/or b) ethylene-based components coming from the Primary; each to a pressure level required to feed the reactor at its inlet pressure. This compression can take place in one or multiple compression stages. The Hyper comprises a plunger reciprocating compressor, and can consist of single or multiple compressor frame(s). For these devices, each compression can be combined with intermediate cooling.

The term "make-up," when used herein, in reference to an ethylene-based feed component (i.e., "make-up ethylene or make-up ethylene feed," "make-up CTA or make-up CTA feed"), refers to reactant, provided from an external source (s), and not provided internally from a recycled source(s). For example, in an embodiment, make-up ethylene is used as "make-up ethylene" required to compensate for the ethylene consumed by the polymerization and/or lost through, for example, ethylene purge from the process and residual ethylene in the polymer.

The term "recycled," when used herein, in reference to a reactant (i.e., "recycled ethylene or recycled ethylene feed," "recycled CTA or recycled CTA feed"), refers to unreacted reactant separated from the polymer in the high pressure separator(s) and/or the low pressure separator(s), and returned/compressed to the reactor.

The terms "feed," "feed flow," or "feed stream," as used herein, refers to make-up and/or recycled components (for example, ethylene, initiator, CTA, and/or solvent) added to a reaction zone at an inlet.

The terms "chain transfer constant" and "chain transfer coefficient (Cs value)" as used herein, refer to the ratio between the "rate of chain transfer" to the "rate of ethylene propagation." See Mortimer references provided in Experimental section. The terms "chain transfer activity," "transfer activity," or similar terms, refer to the sum of molar concentration of each applied CTA component multiplied with its chain transfer constant (Cs). The chain transfer constant (Cs) is the ratio of reaction rates Ks/Kp, at a reference pressure (1360 atm) and a reference temperature (130° C.).

The terms "comprising," "including," "having," and their derivatives, are not intended to exclude the presence of any additional component, step or procedure, whether or not the same is specifically disclosed. In order to avoid any doubt, all compositions claimed through use of the term "comprising" may include any additional additive, adjuvant, or compound, whether polymeric or otherwise, unless stated to the contrary. In contrast, the term, "consisting essentially of" excludes from the scope of any succeeding recitation any other component, step, or procedure, excepting those that are not essential to operability. The term "consisting of" excludes any component, step, or procedure not specifically delineated or listed.

The terms "rheology modifier" or "rheology modifying agent," as used herein, refer to components which are able to change the rheology of the polymer, for example, increase G', when incorporated into the polymer. The term "branching agent", refers to components able to form H- or T-branches in Polymer, by which rheology of the polymer is modified, for example, increase of G'.

Test Methods

Density—Samples for density measurement are prepared according to ASTM D 1928. Samples are pressed at 190° C. and 30,000 psi for 3 minutes, and then at (21° C.) and 207 MPa for one min. Measurements are made within 1 hour of sample pressing using ASTM D792, Method B. Melt Index—Melt index, or 12, was measured in accordance by ASTM D 1238, Condition 190° C./2.16 kg, and was reported in grams eluted per 10 minutes.

Standard Method for Hexane Extractables—Polymer pellets (from the polymerization pelletization process, without further modification; approximately 2.2 grams per press) are pressed in a Carver Press at a thickness of 3.0-4.0 mils. The pellets are pressed at 190° C. for 3 minutes at 40,000 $lb_f$. Non-residue gloves (PIP* CleanTeam* CottonLisle Inspection Gloves, Part Number: 97-501) are worn to prevent contamination of the films with residual oils from the hands of the operator. Films are cut into "1-inch by 1-inch" squares, and weighed (2.5±0.05 g). The films are extracted for two hours, in a hexane vessel, containing about 1000 ml of hexane, at 49.5±0.5° C., in a heated water bath. The hexane used is an isomeric "hexanes" mixture (for example, Hexanes (Optima), Fisher Chemical, high purity mobile phase for HPLC and/or extraction solvent for GC applications). After two hours, the films are removed, rinsed in clean hexane, and dried in a vacuum oven (80±5° C.) at full vacuum (ISOTEMP Vacuum Oven, Model 281A, at approximately 30 inches Hg) for 2 hours. The films are then place in a desiccators, and allowed to cool to room temperature for a minimum of one hour. The films are then reweighed, and the amount of mass loss due to extraction in hexane is calculated. This method is based on 21 CRF 177.1520 (d)(3)(ii), with one deviation from FDA protocol—using hexanes instead of n-hexane.

Rheological G'—The sample is prepared from a compression molding plaque. A piece of aluminum foil is placed on a back plate, and a template or mold is placed on top of the back plate. Approx. 12 grams of resin is placed in the mold, and a second piece of aluminum foil is placed over the resin and mold. A second back plate is then placed on top of the aluminum foil. The total ensemble is put into a compression molding press, run at the following conditions: 3 min at 150° C. and 10 bar, followed by 1 min at 150° C. and 150 bar, followed by a "1.5 min" quench cooling to room temperature at 150 bar. A 25 mm disk is stamped out of the compression-molded plaque. The thickness of the disk is approx. 2.0 mm. The rheology measurement to determine G' is done in a $N_2$ environment, at 170° C. and a strain of 10%. The stamped-out disk is placed between the two "25 mm" parallel plates located in an ARES-1 (Rheometrics SC) rheometer oven, which is preheated for at least 30 minutes at 170° C., and the gap of the "25 mm" parallel plates is slowly reduced to 1.65 mm. The sample is allowed to remain for exactly 5 mins at these conditions. The oven is then opened, the excess sample is carefully trimmed around the edge of the plates, and the oven is closed. The storage modulus (G') and loss modulus (G") are measured via a small amplitude, oscillatory shear according to a decreasing frequency sweep form 100 to 0.1 rad/s (when able to obtain a G" value lower than 500 Pa at 0.1 rad/s), or from 100 to 0.01 rad/s. For each frequency sweep, 1–points (logarithmically spaced) per frequency decade are used. The data are plotted (G' (Y-axis) versus G" (X-axis)) on a log-log scale. The Y-axis scale covers the range from 10 to 1000 Pa, while the X-axis scale covers the range from 100 to 1000 Pa. The Orchestrator software is used to select the data in the region where G" is between 200 and 800 Pa (or using at least 4 data points). The data are fit to a log polynomial model using the fit equation $Y=C1+C2 \ln(x)$. Using Orchestrator software, G' at G" equal to 500 Pa, is determined by interpolation. G' at G"=500 Pa is reported.

EXPERIMENTAL

Calculations for Z1, Z2 and Zi: The "reactor zone molar concentration of a CTA j in a reactor zone i ($[CTA]_{ji}$)" is defined as the "total molar amount of that CTA injected to reactor zones 1 to i" divided by the "total molar amount of ethylene injected to reactor zones 1 to i." This relationship is shown below in Eqn. A.

$$[CTA]_{j_i} = \frac{\sum_{k=1}^{i} n_{CTA,j_k}}{\sum_{k=1}^{i} n_{eth_k}} \quad \text{(Eqn. A)}$$

In Eqn. A, $j \geq 1$, $n_{CTA,j_i}$ is the "amount of moles of the jth CTA injected to the ith reactor zone," and $n_{eth_i}$ is the "amount of moles of ethylene injected to the ith reactor zone." The "transfer activity of a CTA (system) in a reactor zone i" is defined as the "sum of the reactor zone molar concentration of each CTA in the reactor zone" multiplied with its chain transfer activity constant (Cs). The chain transfer activity constant (Cs) the ratio of reaction rates Ks/Kp, at a reference pressure (1360 atm) and a reference temperature (130° C.). This relationship is shown below in Eqn. B, where $n_{comp}i$ is the total number of CTAs in reactor zone i, $$Z_i = \sum_{j_i=1}^{n_{comp,i}} [CTA]_{j_i} \cdot C_{s,j}. \quad \text{(Eqn. B)}$$

Thus, the ratio Z1/Zi is shown below in Eqn. C:

$$\frac{Z_1}{Z_i} = \frac{\sum_{j_i=1}^{n_{comp,i}} [CTA]_{j_1} \cdot C_{s,j}}{\sum_{j_i=1}^{n_{comp,i}} [CTA]_{j_i} \cdot C_{s,j}}. \quad \text{(Eqn. C)}$$

Some chain transfer constant (Cs) are shown below in Table 1. (Cs) values were derived by Mortimer.

TABLE 1

| | (130° C. and 1360 atm | | |
|---|---|---|---|
| | Cs (130° C., 1360 atm) | (0.8-0.2*log(Cs)) | (0.75-0.2*log(Cs)) |
| Methanol | 0.0021 | 1.34 | 1.29 |
| Propane | 0.00302 | 1.30 | 1.25 |
| Ethylacetate | 0.0045 | 1.27 | 1.22 |
| n-butane | 0.005 | 1.26 | 1.21 |
| Isobutane | 0.0072 | 1.23 | 1.18 |
| Ethanol | 0.0075 | 1.22 | 1.17 |
| Cyclohexane | 0.0095 | 1.20 | 1.15 |
| Propylene | 0.0122 | 1.18 | 1.13 |
| Isopropanol | 0.0144 | 1.17 | 1.12 |
| Acetone | 0.0168 | 1.15 | 1.10 |
| Butene-1 | 0.047 | 1.07 | 1.02 |
| MEK | 0.06 | 1.04 | 0.99 |
| PA | 0.33 | 0.90 | 0.85 |
| n-butanethiol | 5.8 | 0.65 | 0.60 |

In Table 1, the Cs-Values as Measured by Mortimer at 130 ° C. and 1360 atm in References 2, 3 and 4 and calculated boundary values for Z1/Zi ratio. The Cs value is for a CTA system containing only the noted CTA. Ref. No. 2. G. Mortimer; Journal of Polymer Science: Part A-1; Chain transfer in ethylene polymerization; vol 4, p 881-900 (1966). Ref. No. 3. G. Mortimer; Journal of Polymer Science: Part A-1; Chain transfer in ethylene polymerization. Part IV. Additional study at 1360 atm and 130° C.; vol 8, p1513-1523 (1970). Ref. No. 4. G. Mortimer; Journal of Polymer Science: Part A-1; Chain transfer in ethylene polymerization. Part VII. Very reactive and depletable transfer agents; vol 10, p163-168 (1972). See also P. Ehrlich, G.A. Mortimer, Fundamentals of the free radical polymerization of ethylene, Adv. Polymer Sci., Vol 7, 386-448 (1970); G. Mortimer, Journal of Polymer Science: Part A-1, Chain transfer in ethylene polymerization. Part V. The effect of temperature; vol 8, p1535-1542 (1970); G. Mortimer, Journal of Polymer Science: Part A-1, Chain transfer in ethylene polymerization Part V. The effect of pressure, vol 8, p1543-1548 (1970).

When only one CTA is used in the total reactor system, Equations B and C simplify to Equations D and E, respectively.

$$Z_i = [CTA]_i \cdot C_s \quad \text{(Eqn. D)},$$

$$\frac{Z_1}{Z_i} = \frac{[CTA]_1 \cdot C_s}{[CTA]_i \cdot C_s} = \frac{[CTA]_1}{[CTA]_i}. \quad \text{(Eqn. E)}$$

For a multiple CTA-system an averaged Cs-value can be calculated with the following equation:

$$Cs(\text{averaged}) = \sum_{1}^{n} \frac{[CTA]_n * Cs}{\sum_{1}^{n}([CTA]_N * Cs_N)} * Cs_n. \quad \text{(Eqn. F)}$$

Example Calculation Propylene concentration=3400 mol-ppm; Cs-value of propylene=0.0122; PA conc.=1650 mol-ppm; Cs-value of PA=0.33; Cs(averaged)=[(3400 mol-ppm*0.0122*0.0122)+(1650 mol-ppm*0.33*0.33)]/(3400 mol-ppm*0.0122+1650 mol-ppm*0.33)=0.31.

Polymerization Simulations

A polymerization simulation model with applied reaction scheme and kinetics is described by Goto et al., see references below. Other reactor and product modeling frameworks are available through Aspen Plus of Aspen Technology, Inc., Burlington, Mass., USA; and PREDICI of Dr. Wulkow Computing in Technology GmbH (CiT), Rastede, Germany. Process and product responses predicted by these model frameworks are determined by the reactor parameters and the applied reaction scheme and kinetic parameters.

The applied reaction scheme and kinetic parameters are described below. For each well-stirred autoclave reaction zone one calculation cell can be used. For each tubular reaction zone enough calculation cells are used to accurately represent the pressure, temperature and concentration profiles along the tubular reaction zone, such that the simulated product and process results, as reported in Tables 5-8, do not change with the addition of more cells. The polymerization simulations were achieved with Goto LDPE simulation model as described in the following: S. Goto et al; *Journal of Applied Polymer Science: Applied Polymer Symposium*, 36, 21-40, 1981 (Title: *Computer model for commercial high pressure polyethylene reactor based on elementary reaction rates obtained experimentally*). The kinetic data used by Goto et al. was derived from high pressure free radical polyethylene polymerization experiments performed at varying temperature, pressure and polymer concentrations, as described in the following: K Yamamoto, M. Sugimoto; *Rate constant for long chain-chain branch formation in free-radical polymerization of ethylene; J. Macromol. Science-Chem.*, A13 (8), pp. 1067-1080 (1979). The following elementary reaction steps are described by Goto et al.: i) propagation of ethylene, ii) termination of radicals, iii) backbiting or short chain branching (SCB) formation, iv) transfer to polymer or long chain branching (LCB) formation, v) beta elimination of secondary radicals leading to vinyl formation, and vi) beta elimination of tertiary radicals leading to vinylidene formation. See Table 2 for kinetic data for main reactions, where $k_o$ is the pre-exponential or frequency factor; Ea is the activation energy, reflecting the temperature dependence; and $\Delta V$ is the activation volume, reflecting the pressure dependence. All kinetic constants are from Goto et al., except the ko, Ea and $\Delta V$ values for backbiting, which have been optimized to better reflect the level of methyl branches (as may be analyzed by C13 NMR technique) in high pressure polyethylene, as a function of pressure and temperature conditions.

TABLE 2

Kinetic Constants for Main Reactions

| Reaction | $k_o$ (m3/hr/kmol) | Ea (cal/mol) | $\Delta V$ (cc/mol) |
|---|---|---|---|
| Propagation | 5.63E+11 | 10520 | −19.7 |
| Termination | 3E+11 | 3000 | 13 |
| Backbiting | 2.6E+12 | 12130 | −14 |
| Transfer to Polymer | 1.75E+12 | 14080 | 4.4 |
| Beta Elimination of sec rad | 5.82E+11 | 15760 | −22.6 |
| Beta Elimination of tert rad | 8.51E+10 | 14530 | −19.7 |

The kinetic data for selected CTAs are given in Table 3. The kinetic constants have been calculated with the help of the kinetic constants on the Cs-value (ks/kp), as determined by Mortimer and the ethylene propagation kinetics as given by Goto et al. (see Table 2).

TABLE 3

Kinetic Constants for Selected CTA's

| | Chain Transfer to Modifier | | | | |
|---|---|---|---|---|---|
| | kao | | | Reactivity Ratios | |
| CTA | (m3/hr/kgmol) | Ea (cal/mol) | $\Delta V$ (cc/mol) | $r_1$ ($k_{11}/k_{12}$) | $r_2$ ($k_{22}/k_{21}$) |
| Propylene (CTA) | 2.20E+11 | 13220 | −16.7 | 3.10 | 0.77 |
| Propionaldehyde | 1.07E+11 | 9720 | −8.4 | 0.00 | 0.00 |
| Acetone | 3.25E+11 | 13320 | −18.6 | 0.00 | 0.00 |
| Isobutane | 3.51E+11 | 14020 | −16.7 | 0.00 | 0.00 |

Short Chain Branching Prediction

Regarding SCBs, the backbiting mechanism generates mostly ethyl and butyl branches, while methyl branches are formed through copolymerization when propylene is used as a CTA to lower product density. A methyl branch has less impact on product density and extractability than an ethyl/butyl branch and, for calculation purposes, it has been assumed that the impact of a methyl branch is 75% of the impact of an ethyl/butyl branch on product density, leading to: $SCB_{frequency} = SCB_{by\ backbiting} + 0.75 \cdot SCB_{by\ propylene}$.

Parameter for Modeling of Hexane Extractable Level:

The extractability of polymer molecules in non-polar solvents is influenced by polymer density (or in other words, by polymer melting point or SCB frequency), and molecular weight. A higher SCB level and lower molecular weight will promote extraction. In a tubular reactor, the polymer formed in the last reaction zone, at peak temp., will greatly contribute to and determine the final extractable level, since it typically has the highest level of SCB combined with a low chain length, due to lower degree of polymerization (DP, the propagation rate divided by the sum of all chain termination steps excluding LCB) and the higher degree of LCB. The probability of further growth of formed small molecules by the LCB mechanism is minimal by size of the molecules and low amount of remaining polymerization.

The chain segment length is calculated with the help of the following formula: Chain segment length (number of carbons)=$(1000-3 \cdot SCB_{freq})/(1000/DP + LCB_{freq})$ and reflects the average chain segment lengths of the polymer formed at the conditions leading to the SCB frequency, DP and LCB frequency values. Using the maximum SCB frequency and maximum LCB frequency in the last reaction zone, an average value for the minimum polymer chain segment length can be calculated. The minimum chain segment length listed in Table 8 shows the number of carbon atoms of the linear backbone. The length of an average SCB was assumed to be 3 carbon atoms, being the average of an ethyl and butyl branch. Methyl branches deriving from propylene as a CTA were treated after application of the 0.75 correction factor in a similar manner. The following is a representative calculation for the minimum chain segment length based on the values from Inventive Example 2: Minimum DP=494.6 ethylene units or 989.2 Carbon atoms; Maximum SCB frequency=36.86 per 1000 Carbon atoms (1000C); Maximum LCB frequency=10.46 per 1000C; Minimum Chain segment length=$(1000-3 \cdot 36.86)/(1000/989.2+10.46)$=77.5 Carbon atoms.

Study 1—Comparative Actual Polymerization Examples

In each flow scheme, FIGS. 3-5 (CE3'-12'), in the Reactor, the polymerization is initiated with the help of free radical initiation systems, injected and/or activated at the inlet of each reaction zone. The maximum temperature in each reaction zone is controlled at a set point by regulating the concentration and/or feed amount of initiation system at the start of each reaction zone. After finishing the reaction, and having applied multiple cooling steps, the reaction mixture is depressurized and/or cooled in (10), and separated in the high pressure separator (HPS). The HPS separates the reaction mixture into an ethylene rich stream (15), containing minor amounts of waxes and/or entrained polymer, and a polymer rich stream (11) which is sent for further separation to the LPS. Ethylene stream (15) is cooled and liquids and/or solids are removed in stream (17). Stream (16) is a purge stream to remove impurities and/or inerts. The polymer separated in the LPS is further processed in (12). The ethylene removed (13) in the LPS is fed to the Booster, where, during the compression, condensables such as solvent, lubrication oil and others are collected and removed through stream (14). The outlet of the Booster is combined with make-up ethylene stream (1), and further compressed by the Primary compressors. In each reaction zone, pressurized water was used for cooling and/or heating the reaction medium, by circulating this water through the jacket of the reactor. The non-converted ethylene, and other gaseous components in the reactor outlet, were recycled through the high pressure recycle and low pressure recycle, and were compressed and distributed through the booster, primary and hyper (secondary) compressor systems.

Description of Flow Diagram Used for Comparative Examples 3', 4', 5', 8' and 9'

FIG. 5 shows the flow scheme of the polymerization process with a tubular reactor, used to produce Comp. Exs. 3', 4', 5', 8' and 9'. Stream (1), ethylene make-up, is compressed together with the outlet of the Booster by Primary compressor A and B, resulting in stream (2) and (3). Stream (3) is fed together with additional ethylene from the high pressure recycle stream (19) through line (5) to the Hyper compressor part feeding the front (9) of the Reactor. Stream (2) is combined with the high pressure recycle stream (17) resulting in stream (18). The Hyper compressor part feeding the side stream (8) receives ethylene feed through line (18) and (4). The ethylene supplied by line (8) is distributed through line (20) and (21) to the side of the reactor. CTA is fed through Line (6) and Line (7). After finishing the reaction, and having applied multiple cooling steps, the reaction mixture is depressurized and/or cooled in (10), and separated as discussed above.

Description of Flow Diagram Used for Comparative Examples 6', 10' and 11'—FIG. 3 shows the flow scheme of the high pressure polymerization process with a tubular reactor used to produce Comp. Exs. 6', 10' and 11'. Stream (1), ethylene make-up, is compressed together with the outlet of the Booster by two parallel Primary compressors A+B, both have similar capacity, resulting in flow (2) and flow (3). Gaseous CTAs (for instance propylene or isobutane) can be added through (22) to the feed of Primary compressor A. Liquid CTAs can be added via Stream (6) and/or Stream (7). Stream (2) is combined with high pressure recycle stream (18), and distributed over flow (4) and flow (19). The Hyper compressor part feeding the front (9) of the reactor, receives from line (18) ethylene feed through line (19) and line (5). The Hyper compressor part feeding the side stream (8) receives ethylene feed through line (4). The ethylene supplied by line (8) is distributed through line (20) and (21) to the side of the reactor. Line (4) receives ethylene feed from line (3) and additional ethylene from line (18). The Hyper pressurizes the ethylene feed streams to a level sufficient to feed the high pressure tubular reactor (Reactor). After finishing the reaction, and having applied multiple cooling steps, the reaction mixture is depressurized and/or cooled in (10), and separated as discussed above.

Description of Flow Diagram Used for Comp. Exs. 7' and 12'

FIG. 4 shows the flow scheme of the high pressure polymerization with a tubular reactor, used to produce Comp. Exs. 7' and 12'. Stream (1), ethylene make-up, is compressed together with the outlet of the Booster by Primary compressor system resulting in flow (3). Stream (3) is combined with high pressure recycle stream (19) and fed through line 5 to the Hyper compressor part feeding the front (9) of the Reactor. The Hyper compressor part feeding the side stream (8) receives ethylene feed through line (4). The ethylene supplied by line (8) is distributed through line (20) and (21) to the side of the reactor. Line (4) receives ethylene feed from line (18). The CTA is fed through line (6) and/or (7) or line (22). The Hyper pressurizes the ethylene feed streams to a level sufficient to feed the high pressure tubular reactor (Reactor). After finishing the reaction, and having applied multiple cooling steps, the reaction mixture is depressurized and/or cooled in (10), and separated as discussed above.

Comp. Exs. 3'-12'—The reaction zones in all comparative example polymerizations were initiated with peroxide systems described in Table 4, if not mentioned differently. The amount of peroxide system to each reaction zone was adjusted to reach peak control temperatures.

TABLE 4

Initiators

| Initiator | Abbreviation | Used in Rx-zone 1/2/3 |
| --- | --- | --- |
| tert-Butyl peroxy-2-ethyl hexanoate | TBPO | yes/yes/no |
| Di-tert-butyl peroxide | DTBP | yes/yes/yes |

For the actual polymerizations, each polymerization was carried out in tubular reactor with three reaction zones. In each reaction zone, pressurized water was used for cooling and/or heating the reaction medium, by circulating this water through the jacket of the reactor. Organic peroxides (see Table 4) were fed into each reaction zone. In each reaction zone, pressurized water was used for cooling and/or heating the reaction medium, by circulating this water through the jacket of the reactor. Each reaction zone had one inlet and one outlet. Each inlet stream consisted of the outlet stream from the previous reaction zone and/or an added ethylene-rich feed stream. After reaching the first peak temperature in reaction zone 1, the reaction medium was cooled down with pressurized water. At the outlet of the first reaction zone, the reaction medium was further cooled by injecting a cold ethylene-rich feed stream (#20), and the reaction was initiated again, by feeding an organic peroxide system into the reaction zone. This process was repeated at the end of the second reaction zone, to enable further polymerization in the third reaction zone. The non-converted ethylene, and other gaseous components in the reactor outlet, were recycled through a high pressure recycle and a low pressure recycle, and were compressed and distributed through the booster, primary and hyper (secondary) compressor systems. The polymer was extruded and pelletized (about 30 pellets per gram), using a single screw extruder.

Comp. Exs. 3', 4', 5', 8' and 9'—The polymerization was carried out in tubular reactor with three reaction zones, according to the flow scheme shown in FIG. 5. The inlet-pressure was 2100 bar, and the pressure drop over the whole tubular reactor system was about 260 bars. Organic-peroxides (Table 4) and were fed into each reaction zone. TRIGONOX™ 301 was added in reaction zone 1 and 2. Acetone was used as a chain transfer agent (CTA), and it was present in each reaction zone inlet, originating from the low pressure and high pressure recycle flows (#13 and #15), as well as from injected CTA make-up stream #6 and #7. The make-up ethylene is fed through stream #1. The polymer was extruded and pelletized (about 30 pellets per gram), using a single screw extruder system, at a melt temperature around 230-250° C. The weight ratio of the ethylene-rich feed streams to the three reaction zones was 1.00:0.76:0.24. The internal process velocity was approximately 12.5, 9 and 11 msec for respectively the $1^{st}$, $2^{nd}$ and $3^{rd}$ reaction zones. Additional information can be found in Tables 5 and 6. Comp. Ex. 5'—Propylene was used as the CTA. The propylene was added to the suction of Primary A and not via stream 5 and 6. Comp. Ex. 9'—No TRIGONOX™ 301 was used, and propionaldehyde was the CTA. See also Tables 5-8.

Comp. Ex. 6', 10' and 11'—The polymerization was carried out in tubular reactor with three reaction zones, according flow scheme shown in FIG. 3. The inlet-pressure was 2155 bar, and the pressure drop over the whole tubular reactor system was about 275 bars. Organic peroxides (see Table 4) were fed into each reaction zone. Propylene was used as a chain transfer agent (CTA), and it was present in each reaction zone inlet, originating from the low pressure and high pressure recycle flows (#13 and #15), as well as from injected CTA make-up stream #22. The make-up ethylene is fed through stream #1. The polymer was extruded and pelletized (about 30 pellets per gram), using a single screw extruder, at a melt temp. around 230-250° C. The weight ratio of the ethylene-rich feed streams to the three reaction zones was 1.00:0.80:0.20. The internal process velocity was approximately 12.5, 9 and 11 msec for respectively the $1^{st}$, $2^{nd}$ and $3^{rd}$ reaction zones. Comp. Ex. 10'—Propionaldehyde was the CTA and added via stream #7. Comp. Ex. 11'—Isobutane was the CTA and added via stream #22.

Comp. Ex. 7' and 12'—The polymerization was carried out in tubular reactor with three reaction zones. See FIG. 4. This configuration leads to the lowest ratios of CTA concentration in the front ethylene-based feed versus the concentrations of CTA in sequential ethylene-based feed streams. In each reaction zone, the polymerization was initiated with organic peroxides as described in Table 4. The weight ratio of the ethylene-rich feed streams to the three reaction zones was 1.00:0.60:0.40. Propionaldehyde (PA) was used as CTA, and it was present in each reactor inlet, originating from the low and high pressure recycle flows (#13 and #15), as well as from injected CTA make-up stream #22. The make-up ethylene is fed through stream #1. See also Tables 5 and 6. Comp. Ex. 12'—Propionaldehyde (CTA) was added via streams #6 and #7, and TRIGONOX™ 301 was used in reaction zones 1 and 2. See Tables 5-8.

Summary of Actual Polymerization Results—Comparative Examples 3'-12' show the following. The results of the iso-butane as CTA, with reduced CTA-activity at the inlet of the reactor and/or in the first reaction zone, versus using propylene as the CTA, show the importance of reducing the CTA-activity at the inlet of the reactor and/or in the first reaction zone over the CTA-activity in subsequent reaction zones. Replacing iso-butane by propylene resulted in lower densities, higher extractable levels and less effective use of the rheology modifier, as shown by a higher consumption rate of the rheology modifier. Using PA (propionaldehyde), as the CTA, and increasing its concentration and activity to the subsequent reaction zones, led to an effective use (high G' value, and/or, in general, low consumption of the modifier) of the rheology modifier, and a product with a high G' value. The comparative examples were made at varying densities, melt indices, G' and hexane extractables. These comparative examples were used to derive correlations for G', density and hexane-extractables. The comparative examples, made at high G' and polymer densities between 0.9190 and 0.9240 g/cc, show lower hexane-extractable-levels than similar examples at densities below 0.9190 g/cc. The inventive examples have even lower hexane-extractable levels.

Derivation of Correlation for Predicting G', Density and Hexane-Extractable

Empirical models are derived, valid for polymers of the type defined here, based on key outputs from the process simulations and based on measured polymer properties. The models are derived with linear regression using commercial software JMP®PRO version 11.1.1. Density is modeled with the following equation: Density [g/cc]=0.9541−(0.001152*$SCB_{freq}$ [1/1000C])−(0.000502*$LCB_{freq}$ [1/1000C])+(0.002547*log MI [dg/min]) Eqn. G. The density calculated by Eqn. G is representative of the actual measured density in the respective polymer sample. Based on the samples CE3'-CE12', this model has a correlation coefficient $R^2$ of 0.979. The predicted density is given in Table 7 for all samples, including those samples where measured density is available. The G' (at G"=500 Pa, 170 C) is modeled with the following equation: G' (at G"=500 Pa, 170 C) ([Pa]=10^(2.0113−(0.2616*log MI [dg/min])+(0.07186*$LCB_{freq}$[1/1000C])−(0.1995*Z1/Zi)−(0.0176*log Cs)) Eqn. H. The G' value calculated by Eqn. H is representative of the actual measured G' value in the respective polymer sample. Based on the samples CE3'-CE12', this model (in the log G' form) has a correlation coefficient $R^2$ of 0.986. The predicted G' (at G"=500 Pa, 170 C) is given in Table 7 for all samples, including those samples where measured G' is available.

The hexane extractable is modeled with the following equation: Hexane extractable [wt %]=−1.65+(0.1989*Maximum $SCB_{freq}$ in last Rx-zone [1/1000C])−(0.0486*Minimum Chain segment length in last Rx-zone) (Eqn. I). The hexane extractable level calculated by Equation I is representative of the actual measured hexane level in the respective polymer sample. Based on the samples CE3'-CE12', this model has a correlation coefficient $R^2$ of 0.862. The predicted hexane extractable—see Table 8 for all samples, including those samples where measured hexane extractable is available. The model is based on simulation results in the last process zone. Apparent hexane extractable for each reactor zone i is provided by applying the same eqn. with the same inputs, but now selected in that same reactor zone i. Apparent Hexane extractable (zone k)=−1.65+(0.1989*Maximum SCB level in Rx-zone k)−(0.0486*Minimum Chain segment length in Rx-zone k) (Eqn. J).

Study 2: Comparative Simulated Examples and Inventive Simulation Examples—Description of Flow Diagram Used for Comp. Exs. 1 and 2—The flow diagrams for Comp. Exs. 1 and 2 are described in patent application EP2681250-B1.

Description of Flow Diagram Used for Inv. Ex. 1 to 5—FIG. 1 shows the flow scheme of the high pressure polymerization process with a tubular reactor, used to produce Inventive Example 1 to 5. Stream (1), ethylene make-up, is compressed together with the outlet of the Booster by Primary compressor system resulting in flows (2) and (3). Stream (2) and (3) are combined with the high pressure recycle stream (18) and fed through line (19) and (5) to the Hyper compressor part feeding the front (9) of the Reactor. The Hyper compressor part feeding the side stream (8) receives ethylene feed through line (4). The ethylene supplied by line (8) is distributed through line (20) to the side of the reactor. Line (4) receives ethylene feed from line (18). The Hyper pressurizes the ethylene feed streams to a level sufficient to feed the high pressure tubular reactor (Reactor). Stream (6) and/or stream (7) depict the CTA feed. After finishing the reaction, and having applied multiple cooling steps, the reaction mixture is depressurized and/or cooled in (10), and separated as discussed above.

Description of Flow Diagram Used for Inv. Exs. 6 to 13 and Comp. Ex 13—FIG. 2 shows the flow scheme of the high pressure polymerization process with a tubular reactor, used to produce Inv. Exs. 6 to 13 and Comp. Ex 13. Stream (1), ethylene make-up, is compressed together with the outlet of the Booster by Primary compressor system resulting in flow (2). Stream (2) is fed together with additional ethylene from the high pressure recycle stream (18) through line (5) and line (19) to the Hyper compressor parts feeding respectively the side stream (20) and the stream (9) of the Reactor. The Hyper compressor part feeding the side stream (21) receives ethylene feed through line (4) from the high pressure recycle stream (18). The make-up CTA system can be fed through Line (7a) and Line (7b). The distribution of the make-up CTA over line (7a) and (7b) influences the CTA concentration in the reactor zones. After finishing the reaction, and having applied multiple cooling steps, the reaction mixture is depressurized and/or cooled in (10), and separated as discussed above.

General Polymerization Conditions Used in Comp. Simulated Exs. 1, 2 and 13 and Inv. Simulated Exs. 1-13—In all comparative and inventive polymerizations the CTA concentration has been adjusted to achieve a product with a melt index ($I_2$) described in Table 5. Variation in product melt-index is possible by lowering or increasing CTA concentration.

Reactor and Feed Configurations Used in Comp. Simulated and Inv. Simulated Example Polymerizations—Table 5 shows the reactor configuration (i.e., dimensions, lay-out, applied ethylene feed distribution) used for the simulated comparative and inventive polymerizations. The feed distributions show the percent of total ethylene feed stream fed to each reaction zone. The notation "50/50/0/0" means that 50% of the total ethylene feed is fed to the first reaction zone and 50% of the total ethylene feed is fed to the second reaction zone, while no feed streams are fed to the third and fourth reaction zones. The ethylene received in the second, third and fourth reaction zones are carry-over from the previous reaction zones. Likewise, the notation "50/38/12" means that 50% of the total ethylene feed is fed to the first reaction zones, 38% of the total ethylene feed is fed to the second reaction zone and 12% of the total ethylene feed is fed to the third reaction zone. Further Table 5 give information on pressure level and initiation temperatures of all reaction zones, the ethylene feed temperature when a side ethylene feed stream is applied, and the maximum or peak temperatures in each reaction zone (Rx). The ethylene feed temperature can be optionally lowered and/or controlled with a cooler. The temperature of the cooling media is typically in the range of 0 to 220° C., while the temperature for preheating services is typically in the range of 100 to 250° C. The cooling/heating is applied through jackets around the high pressure tubes by co-current or counter-current flow. In the simulations the cooling/preheating was applied by counter-current and with one cooling section per reaction zone.

Comp. Exs. 1 and 2—The polymerization simulations for Comp. Exs. 1 and 2 are based on Comp. Ex. A and Inv. Ex. 2 of the patent application EP2681250-B1. As CTA, propionaldehyde was used. The reactor inlet pressure was 2800 bar. Comp. Ex. A is made in a tubular reactor with 4 reaction zones, and all reactants, except initiators, are fed to the front, resulting in an even CTA distribution, resulting in a product with high density and low hexane extractables and low G'-value. Inv. Ex. 2 is made with Z1/Zi ratio of 0, which gives a much higher G'-value. The Z1/Zi ratio of 0 is achieved by dividing the $1^{st}$ reaction of Comp. Ex. A in two. The first part is receiving only make-up ethylene containing no CTA. The second part is receiving the ethylene from the high-pressure and low pressure recycle also containing recycled CTA and the make-up flow of CTA. This results in a 5 reaction zone configuration that is able to produce polymer with high densities, high G' values and low extractables (see Tables 7 and 8). Inv. Ex. 1 is made at the process conditions described in Tables 5 and 6 and according to FIG. 1. Propionaldehyde is used as CTA. The initiator system was: Rx-zone 1 (TBPiv/TBPO/DTBP/TRIGONOX™ 301), Rx-zone 2 (TBPO/DTBP) and Rx-zone 3 (DTBP). See Tables 7 and 8. Inv. Exs. 2 to 5 are made at the conditions described in Tables 5 and 6 and according to FIG. 1. Propionaldehyde is used as CTA. The initiator system was: Rx-zone 1 (TBPO/DTBP/TRIGONOX™ 301), Rx-zone 2 (TBPO/DTBP/TRIGONOX™ 301), Rx-zone 3 (DTBP) and Rx-zone 4 (DTBP. The main differences are MI and ethylene side stream temperature, which results in different predicted product properties see Tables 7 and 8. Inv. Exs. 6 to 10, 12 and 13 and Comp. Ex 13 are made at the conditions described in Tables 5 and 6 and according to FIG. 2. Propionaldehyde is used as CTA. The initiator system was: Rx-zone 1 (TBPO/DTBP), Rx-zone 2 (TBPO/DTBP), Rx-zone 3 (TBPO/DTBP), Rx-zone 4 (DTBP), Rx-zone 5 (DTBP). The main differences are MI and ethylene side stream temperature, which results in different predicted product properties see Tables 7 and 8. Inv. Ex. 11 is made at the conditions described in Tables 5 and 6 and according to FIG. 2. Propionaldehyde is used as CTA. The initiator system was: Rx-zone 1 (TBPO/DTBP/TRIGONOX™ 301), Rx-zone 2 (TBPO/DTBP/TRIGONOX™ 301), Rx-zone 3 (TBPO/DTBP), Rx-zone 4 (DTBP), Rx-zone 5 (DTBP). By applying higher peak temperatures a higher G'-value can be achieved compared to Inv. Exs. 9 and 10. The predicted product properties are given in Tables 7 and 8.

Summary of Simulated Polymerization of Study 2—Comp. Ex. 1 shows a high density and low hexane extractable, but also a very low G' value. Comp. Ex. 2 has a good G' value and hexane extractable level, but too high a density. The low hexane extractable-level is achieved, by applying low peak-temperatures in the last reaction zone(s). The desired densities are achieved by applying the correct combination of CTA-system, peak temperatures and reactor pressure. Comp. Exs. 3 to 12 are actual polymerizations, and are used to derive the correlations for density, G' and hexane extractables as described above. Comp. Ex. 13 has a high G' value at relevant density, but too high hexane extractable level, due to high peak temperatures. Table 9 lists tubular products together and some autoclave extrusion products. Autoclave resins have low hexane extractables due to the lower maximum polymerization temperatures. These resins are very suitable for food contact and cook-in applications requiring a hexane extractable level requirement <2.6 wt % and a high melt strength. In autoclave reactors, typically, the ethylene conversion rate is <20%, which is significantly lower than that in a tubular reactor (typically >25%). The commercial tubular products with high G' value, and produced at lower densities, show extraction levels ranging from 3.4 to 4.1 wt %. Standard tubular products can be made at higher densities and low hexane extractable levels, but with low G'-values. Surprisingly, it has been found in Inv. Exs. 1 to 13, that tubular products with low hexane extractable levels and high G'-values can be made in the density range of 0.9190 to 0.9250 g/cc, without rheology-modifying branching agents.

TABLE 5

Reactor Configs, Feed Modes, Process and CTA Conds. for Comp. and Inv. Polyms.
(Note: C3= is propylene)

| | Ethylene feed distribution % | # of Rx-zones | Inlet Press. Bar | Press. drop (ΔP) bar | MI dg/min | CTA | Cs at 1360 atm and 130° C. | CTA distr. Z1/Zi |
|---|---|---|---|---|---|---|---|---|
| | CE3 to 17: tube i.d. (40/60/60 mm), Rx-zone length (distrib.): 1410 m (400/470/540 m); Thru-put about 55000 kg/hr | | | | | | | |
| CE3' | 50/38/12 | 3 | 2100 | 261 | 3.5 | Acetone | 0.0168 | 0.86 |
| CE4' | 50/38/12 | 3 | 2100 | 260 | 5 | Acetone | 0.0168 | 0.86 |
| CE5' | 50/38/12 | 3 | 2100 | 254 | 5.2 | C3= | 0.0122 | 0.86 |
| CE6' | 50/40/10 | 3 | 2155 | 275 | 4.28 | C3= | 0.0122 | 1.14 |
| CE7' | 50/30/20 | 3 | 2140 | 264 | 4.14 | PA | 0.33 | 0.71 |
| CE8' | 50/38/12 | 3 | 2100 | 273 | 2 | Acetone | 0.0168 | 0.86 |
| CE9' | 50/34/16 | 3 | 2100 | 260 | 7.4 | PA | 0.33 | 0.92 |
| CE10' | 50/34/16 | 3 | 2100 | 260 | 7.1 | PA | 0.33 | 1.2 |
| CE11' | 50/40/10 | 3 | 2220 | 284 | 4 | isobutane | 0.0072 | 1.14 |
| CE12' | 50/38/12 | 3 | 2078 | 295 | 0.75 | PA | 0.33 | 0.89 |
| | CE1: tube i.d. 76 mm, Rx-zone length (distrib.): 2000 m (640/560/560/240 m) and Thru-put 117000 kg/hr | | | | | | | |
| CE1 | 100/0/0/0 | 4 | 2800 | 356 | 5 | PA | 0.33 | 1 |
| | CE2: tube i.d. 76 mm, Rx-zone length (distrib.): 2000 m (160/480/560/560/240 m) and Thru-put 117000 kg/hr | | | | | | | |
| CE2 | 20/80/0/0/0 | 5 | 2800 | 324 | 2.7 | PA | 0.0122 | 0 |
| | IE1: tube i.d. (40/56/56 mm), Rx-zone length (distrib.): 1310 m (300/600/410 m); Thru-put 60000 kg/hr | | | | | | | |
| IE1 | 50/50/0 | 3 | 2200 | 450 | 4.0 | PA | 0.33 | 0.7143 |
| | IE2 to5: tube i.d. (40/56/56/56mm), Rx-zone length (distrib.): 1500 m (300/500/400/300 m); Thru-put 60000 kg/hr | | | | | | | |
| IE2 | 50/50/0/0 | 4 | 2400 | 520 | 1.5 | PA | 0.33 | 0.7692 |
| IE3 | 50/50/0/0 | 4 | 2400 | 500 | 1.5 | PA | 0.33 | 0.7692 |
| IE4 | 50/50/0/0 | 4 | 2400 | 450 | 10.1 | PA | 0.33 | 0.7143 |
| IE5 | 50/50/0/0 | 4 | 2400 | 440 | 10.3 | PA | 0.33 | 0.7143 |
| | IE6 to13 and CE sim: tube i.d. (30/40/58/58/58 mm), Rx-zone length (distrib.): 1800 m (200/300/500/400/400 m); Thru-put 60000 kg/hr | | | | | | | |
| IE6 | 25/25/50/0/0 | 5 | 2400 | 570 | 1.5 | PA | 0.33 | 0.7692 |
| IE7 | 25/25/50/0/0 | 5 | 2200 | 560 | 1.5 | PA | 0.33 | 0.7692 |
| IE8 | 25/25/50/0/0 | 5 | 2400 | 590 | 1.5 | PA | 0.33 | 0.7692 |
| IE9 | 25/25/50/0/0 | 5 | 2400 | 540 | 4.0 | PA | 0.33 | 0.7042 |
| IE10 | 25/25/50/0/0 | 5 | 2400 | 530 | 4.0 | PA | 0.33 | 0.7042 |
| IE11 | 25/25/50/0/0 | 5 | 2400 | 560 | 4.0 | PA | 0.33 | 0.7042 |
| IE12 | 25/25/50/0/0 | 5 | 2400 | 500 | 9.9 | PA | 0.33 | 0.7042 |
| IE13 | 25/25/50/0/0 | 5 | 2400 | 500 | 10.0 | PA | 0.33 | 0.7042 |
| CE13 | 25/25/50/0/0 | 5 | 2400 | 550 | 4.0 | PA | 0.33 | 0.7042 |

TABLE 6

Reactor Temperatures, Conversions and Simulated Conversions and Polymer Branching Levels

| | Peak temps ° C. | (Re)initiation temps ° C. | Side stream(s) temp ° C. | Ethylene conv measured % | Ethylene conv simulated % | Simul. LCB #/ 1000 C | Simul. SCB #/ 1000 C | Simul. Vinyl #/ 1000 C |
|---|---|---|---|---|---|---|---|---|
| CE3' | 330/321/310 | 140/154/233 | 61 | 31.8 | 32.3 | 5.33 | 28.7 | 0.131 |
| CE4' | 337/330/310 | 140/157/244 | 62 | 32.4 | 33.2 | 5.72 | 29.3 | 0.136 |
| CE5' | 330/319/306 | 140/151/231 | 62 | 31.8 | 32.2 | 5.23 | 31.4 | 0.376 |
| CE6' | 293/293/294 | 146/148/220 | 68 | 28.2 | 28.0 | 3.67 | 29.5 | 0.497 |
| CE7' | 292/294/294 | 145/159/197 | 56 | 28.4 | 28.4 | 3.74 | 25.5 | 0.108 |
| CE8' | 331/326/311 | 140/154/238 | 62 | 33.4 | 32.4 | 5.47 | 28.9 | 0.134 |

TABLE 6-continued

Reactor Temperatures, Conversions and Simulated Conversions and Polymer Branching Levels

|  | Peak temps ° C. | (Re)initiation temps ° C. | Side stream(s) temp ° C. | Ethylene conv measured % | Ethylene conv simulated % | Simul. LCB #/ 1000 C | Simul. SCB #/ 1000 C | Simul. Vinyl #/ 1000 C |
|---|---|---|---|---|---|---|---|---|
| CE9' | 325/319/296 | 140/149/209 | 62 | 30.4 | 32.2 | 4.97 | 27.6 | 0.123 |
| CE10' | 324/318/294 | 140/147/209 | 62 | 32.1 | 32.1 | 4.90 | 27.6 | 0.122 |
| CE11' | 293/293/293 | 145/152/196 | 60 | 27.7 | 27.5 | 3.74 | 26.5 | 0.116 |
| CE12' | 331/326/300 | 140/160/248 | 58 | 29.2 | 30 | 5.03 | 28.5 | 0.131 |
| CE1 | 307/307/301/301 | 157/247/252/260 | none | 29.9 | 30.5 | 3.25 | 24.1 | 0.121 |
| CE2 | 307/278/300/300/300 | 157/196/243/247/256 | 157 | 28.3 | 28.2 | 2.83 | 23.3 | 0.116 |
| IE1 | 340/320/299 | 130/146/249 | 20 |  | 32.82 | 4.916 | 27.28 | 0.126 |
| IE2 | 335/330/305/288 | 140/148/275/268 | 20 |  | 35.21 | 5.137 | 27.14 | 0.131 |
| IE3 | 335/330/306/292 | 140/177/266/267 | 80 |  | 34.91 | 5.206 | 27.75 | 0.136 |
| IE4 | 335/330/300/281 | 140/144/263/255 | 20 |  | 36.71 | 5.213 | 27.12 | 0.130 |
| IE5 | 335/333/300/281 | 140/173/256/254 | 80 |  | 36.15 | 5.217 | 27.61 | 0.134 |
| IE6 | 315/315/310/293/284 | 140/174/174/255/259 | 80 |  | 34.75 | 5.074 | 27.09 | 0.126 |
| IE7 | 315/315/310/288/277 | 140/171/171/251/252 | 80 |  | 34.16 | 5.35 | 27.91 | 0.125 |
| IE8 | 315/315/310/295/277 | 140/146/152/264/263 | 20 |  | 35.31 | 5.091 | 26.49 | 0.121 |
| IE9 | 315/315/310/290/272 | 140/144/149/258/254 | 20 |  | 35.99 | 5.062 | 26.36 | 0.120 |
| IE10 | 315/315/310/292/277 | 150/153/158/261/257 | 40 |  | 35.18 | 5.009 | 26.61 | 0.122 |
| IE11 | 335/330/320/292/275 | 140/151/155/263/257 | 20 |  | 37.48 | 5.769 | 27.55 | 0.129 |
| IE12 | 315/315/293/274 | 150/151/155/257/253 | 40 |  | 35.95 | 5.089 | 26.65 | 0.122 |
| IE13 | 315/315/310/290/270 | 140/142/147/253/249 | 20 |  | 36.83 | 5.13 | 26.38 | 0.120 |
| CE13 | 315/315/310/296/286 | 140/144/150/259/259 | 20 |  | 37.33 | 5.464 | 26.9 | 0.123 |

TABLE 7 measured and predicted density and G' for polymers

| | Density measured g/cc | Density predicted Eqn. G g/cc | G' meas. Pa | G' predicted Eqn. H Pa | G' limit Eqn in claim 1 Pa |
|---|---|---|---|---|---|
| CE3' | 0.9196 | 0.9198 | 126 | 129 | 123 |
| CE4' | 0.9188 | 0.9193 | 132 | 126 | 115 |
| CE5' | 0.9177 | 0.9171 | 113 | 115 | 114 |
| CE6' | 0.9195 | 0.9199 | 79 | 82.4 | 118 |
| CE7' | 0.9246 | 0.9245 | 99 | 96.7 | 119 |
| CE8' | 0.9193 | 0.9189 | 153 | 153 | 135 |
| CE9' | 0.9220 | 0.9221 | 89 | 92.5 | 107 |
| CE10' | 0.9221 | 0.9221 | 83 | 81.3 | 107 |
| CE11' | 0.9235 | 0.9233 | 89 | 85.7 | 120 |
| CE12' | 0.9183 | 0.9185 | 172 | 172 | 156 |
| CE1 |  | 0.9265 |  | 74.3 | 115 |
| CE2 |  | 0.9270 |  | 137 | 128 |
| IE1 |  | 0.9217 |  | 118.3 | 113.9 |
| IE2 |  | 0.9207 |  | 154.7 | 139.4 |
| IE3 |  | 0.9200 |  | 156.4 | 139.4 |
| IE4 |  | 0.9228 |  | 97.5 | 89.7 |
| IE5 |  | 0.9223 |  | 97.1 | 89.2 |
| IE6 |  | 0.9208 |  | 153.1 | 139.4 |
| IE7 |  | 0.9197 |  | 160.2 | 139.4 |
| IE8 |  | 0.9215 |  | 153.5 | 139.4 |
| IE9 |  | 0.9227 |  | 121.8 | 113.9 |
| IE10 |  | 0.9225 |  | 120.6 | 113.8 |
| IE11 |  | 0.9210 |  | 136.8 | 113.8 |
| IE12 |  | 0.9234 |  | 96.4 | 90.2 |
| IE13 |  | 0.9237 |  | 96.9 | 90.0 |
| CE13 |  | 0.9219 |  | 130.2 | 113.9 |

TABLE 8*

| | Max. SCB freq in RX-zone (i-2)/(i-1)/ (i)#1000 C | MM. CSL level in RX-zone (i-2)/(i-1)/ (i)#1000 C | Hexane extr. Meas. wt % | Apparent in (i-2) Rx-zone Eqn J wt % | Apparent in (i-1) Rx-zone Eqn J wt % | Predicted from i$^{th}$ Rx-zone Eqn I wt % | Hex Ext. Eqn 1 wt % |
|---|---|---|---|---|---|---|---|
| CE3' | 34.2/37.7/38.9 | 129.1/78.9/62.2 | 3 | <0.5 | 2.01 | 3.06 | 2 |
| CE4' | 36.2/39.3/39.3 | 117.6/70.1/60.0 | 3.8 | <0.5 | 2.76 | 3.25 | 2 |
| CE5' | 38.1/41.0/42.1 | 125.2/78.0/62.8 | 3.5 | <0.5 | 2.71 | 3.67 | 2 |
| CE6' | 34.2/36.5/39.3 | 199.7/120.6/83.9 | 2.1 | <0.5 | <0.5 | 2.09 | 2 |
| CE7' | 28.9/32.3/34.9 | 224.6/121.3/84.7 | 1.3 | <0.5 | <0.5 | 1.17 | 1.17 |
| CE8' | 35.2/38.5/39 | 129.2/75.1/62.1 | 3 | <0.5 | 2.36 | 3.09 | 2 |
| CE9' | 34.2/37.4/36.7 | 136.9/78.4/69.3 | 1.9 | <0.5 | 1.98 | 2.28 | 1.80 |
| CE10' | 34.2/37.2/36.5 | 136.6/79.4/70.6 | 1.8 | <0.5 | 1.89 | 2.18 | 1.80 |
| CE11' | 30.4/32.4/36.3 | 197.1/129.2/83.1 | 1.4 | <0.5 | <0.5 | 1.53 | 1.44 |
| CE12' | 35.3/38.5/36.5 | 128.3/76.0/75.3 | 2.5 | <0.5 | 2.31 | 1.95 | 2 |
| CE1 | 28.7/30.4/33.1 | 160.8/117.6/85.8 |  | <0.5 | <0.5 | 0.76 | 0.68 |
| CE2 | 26.6/28.7/31 | 209.8/144.7/105.8 |  | <0.5 | <0.5 | <0.5 | 0.53 |
| IE1 | 35.5/36.0/36.8 | 116.2/85.0/66.9 |  | <0.5 | 1.39 | 2.42 | 1.781 |
| IE2 | 35.9/35.5/35.7 | 85.0/74.9/67.6 |  | 1.35 | 1.78 | 2.18 | 1.954 |
| IE3 | 35.2/35.3/36.1 | 94.0/77.4/66.9 |  | 0.78 | 1.61 | 2.27 | 2.000 |
| IE4 | 36.0/35.1/35.1 | 83.0/74.3/67.5 |  | 1.47 | 1.72 | 2.05 | 1.595 |
| IE5 | 35.8/34.9/34.8 | 87.0/76.4/69.4 |  | 1.21 | 1.58 | 1.88 | 1.745 |

TABLE 8*-continued

| | Max. SCB freq in RX-zone (i-2)/(i-1)/ (i)#1000 C | MM. CSL level in RX-zone (i-2)/(i-1)/ (i)#1000 C | Hexane extr. Meas. wt % | Apparent in (i-2) Rx-zone Eqn J wt % | Apparent in (i-1) Rx-zone Eqn J wt % | Predicted from $i^{th}$ Rx-zone Eqn I wt % | Hex Ext. Eqn 1 wt % |
|---|---|---|---|---|---|---|---|
| IE6  | 33.7/34.3/35.5 | 100.1/81.9/69.4 | <0.5 | 1.20 | 2.04 | 1.930 |
| IE7  | 35.3/35.1/35.9 | 91.1/78.4/67.8 | 0.94 | 1.52 | 2.20 | 2.000 |
| IE8  | 34.6/35.3/35.0 | 88.5/74.3/70.5 | 0.93 | 1.76 | 1.88 | 1.745 |
| IE9  | 34.6/34.6/34.3 | 87.4/76.3/71.8 | 0.98 | 1.52 | 1.69 | 1.515 |
| IE10 | 34.2/34.4/34.6 | 92.2/79.4/72.1 | 0.67 | 1.34 | 1.73 | 1.585 |
| IE11 | 36.5/35.5/35.4 | 75.0/70.1/65.8 | 1.97 | 2.01 | 2.20 | 1.980 |
| IE12 | 34.3/34.7/34.4 | 90.3/76.3/71.6 | 0.78 | 1.55 | 1.70 | 1.435 |
| IE13 | 34.7/34.8/34.1 | 85.8/74.1/71.6 | 1.08 | 1.66 | 1.64 | 1.356 |
| CE13 | 34.6/35.6/36.8 | 87.4/71.6/61.0 | 0.99 | 1.95 | 2.70 | 1.738 |

*Simulated Maximum Short Chain Branching Levels and Minimum Chain Segment Lengths in Last Three Reaction Zones and Measured/Apparent/Predicted Hexane Extractable Levels for Comp. and Inv. Polymerizations.

TABLE 9

Comparative Commercial Resins

| | | MI dg/min | Density g/cc | G'(G' = 500 Pa; 170° C.) Pa | Hexane Extr. wt % | Density g/cc* | G'(G' = 500 Pa; 170° C.) Pa* | Hexane Extr. wt % |
|---|---|---|---|---|---|---|---|---|
| Borealis CT7200   | Tube | 4.7 | 0.9189 | 128  | 4.1      | 0.9190-0.9240 | 110 | 2.0 |
| Dow Agility EC7000| Tube | 3.9 | 0.9188 | 140  | 3.4      | 0.9190-0.9240 | 115 | 2.0 |
| Dow PG7004        | AC   | 4.1 | 0.9215 | 146  | 1.4      | 0.9190-0.9240 | 113 | 1.9 |
| Dow LD410E        | Tube | 2.0 | 0.9242 | 89*  | 1.1 to 1.3 | 0.9190-0.9240 | 132 | 1.0 |
| Dow LD450E        | Tube | 2.0 | 0.9231 | 113* | 1.0 to 1.4 | 0.9190-0.9240 | 132 | 1.3 |
| Dow 50041         | AC   | 4.1 | 0.9234 | 129  | 1.4      | 0.9190-0.9240 | 113 | 1.3 |

* Claim boundaries,
**170° C. data is interpolated from 150° C. and 190° C. data.

What is claimed is:

1. An ethylene homopolymer formed from a free-radical, high pressure polymerization process in a tubular reactor system, said homopolymer comprising the following properties:
    (A) a density from 0.9190 to 0.9250 g/cc;
    (B) a hexane extractable level that is less than, or equal to, 2. 6 wt %, based on the total weight of the polymer;
    (C) a G' (at G"=500 Pa, 170° C.) that meets the following equation:
        G'≥D+E[log(I2)], where D=150 Pa and E=−60 Pa/[log (dg/min)]; and
    (D) a melt index (I2) from 1.0 to 20 dg/min.

2. The ethylene homopolymer of claim 1, wherein a hexane extractable level that is greater than the lower of one of the following:
    (1) (A+(B*density (g/cc))+(C*log(MI) dg/min)), based on total weight of the ethylene-based polymer; where A=250.5 wt %, B=−270 wt %/(g/cc), C=0.25 wt %/[log(dg/min)], or
    (2) 2.0 wt %, based on the total weight of the polymer.

3. The ethylene homopolymer of claim 1, wherein the polymer has a vinyl content less than, or equal to, 0.15 vinyl groups per 1000 total carbons.

4. A process for producing the ethylene homopolymer of claim 1, the process comprising polymerizing a reaction mixture comprising ethylene and at least one free radical, in a reaction configuration, comprising a first tubular reaction zone 1 and a last tubular reaction zone i, in which i is greater than, or equal to, (≥) 3, and under high pressure polymerization conditions, and wherein the "inlet pressure of the polymerization" is greater than, or equal to, [1800 Bar+(100 Bar x # of reaction zones)].

5. The process of claim 4, wherein the first reaction zone 1 has a peak temperature of ≥320° C., and the last reaction zone i has a peak temperature of ≤290° C.

6. The process of claim 4, wherein i is ≥4.

7. The process of claim 4, wherein, a first CTA system having a transfer activity of Z1, is fed into tubular reaction zone 1, and a second CTA system having a transfer activity of Zi, is fed into tubular reaction zone i, and the Z1/Zi ratio is greater than, or equal to, 0.7.

8. The process of claim 4, wherein a first CTA system having a transfer activity of Z1, is fed into tubular reaction zone 1 and a second CTA system having a transfer activity of Zi, is fed into tubular reaction zone i, and the Z1/Zi ratio is less than, or equal to, 1.3.

9. The process of claim 4, wherein a first CTA system having a transfer activity of Z1, is fed into tubular reaction zone 1, and a second CTA system having a transfer activity of Zi, is fed into tubular reaction zone i, and the Z1/Zi ratio is less than, or equal to, (0.8-0.2*log(Cs)), wherein Cs is in the range from 0.0001 to 10.

10. A composition of comprising the homopolymer of claim 1.

* * * * *

UNITED STATES PATENT AND TRADEMARK OFFICE
CERTIFICATE OF CORRECTION

PATENT NO. : 10,358,512 B2
APPLICATION NO. : 15/574291
DATED : July 23, 2019
INVENTOR(S) : Stefan Hinrichs et al.

It is certified that error appears in the above-identified patent and that said Letters Patent is hereby corrected as shown below:

On the Title Page

Column 2 Line 32, item (57) Abstract:
"The invention provides an ethylene homopolymer formed from a free-radical, high pressure polymerization process in a tubular reactor system, said homopolymer comprising the following properties: (A) a density from 0.9190 to 0.9250 g/cc; (B) a hexane extractable level that is less than, or equal to, 2.6 wt %, based on the total weight of the polymer; (C) a G (at G"=500 Pa, 170C) that meets the following equation: G>D+E[log(12)], where D=150 Pa and E=-60 Pa/[log(dg/mn)]; and (D) a melt index (12) from 1.0 to 20 dg/min."

Should read:
--The invention provides an ethylene homopolymer formed from a free-radical, high pressure polymerization process in a tubular reactor system, said homopolymer comprising the following properties: (A) a density from 0.9190 to 0.9250 g/cc; (B) a hexane extractable level that is less than, or equal to, 2.6 wt%, based on the total weight of the polymer; (C) a G' (at G" = 500 Pa, 170°C.) that meets the following equation: G' ≥ D + E[log (I2)], where D = 150 Pa and E = –60 Pa/[log(dg/min)]; and (D) a melt index (I2) from 1.0 to 20 dg/min.--

Signed and Sealed this
Twelfth Day of May, 2020

Andrei Iancu
*Director of the United States Patent and Trademark Office*